US008692562B2

(12) United States Patent
Woodard

(10) Patent No.: US 8,692,562 B2
(45) Date of Patent: Apr. 8, 2014

(54) WIRELESS OPEN-CIRCUIT IN-PLANE STRAIN AND DISPLACEMENT SENSOR REQUIRING NO ELECTRICAL CONNECTIONS

(75) Inventors: Stanley E. Woodard, Hampton, VA (US); Marie Woodard, legal representative, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 350 days.

(21) Appl. No.: 13/195,251

(22) Filed: Aug. 1, 2011

(65) Prior Publication Data

US 2013/0033271 A1 Feb. 7, 2013

(51) Int. Cl.
 *G01R 27/04* (2006.01)
(52) U.S. Cl.
 USPC ............... 324/629; 324/633; 73/781; 73/763
(58) Field of Classification Search
 USPC ............ 324/629, 633–636, 691, 719, 207.11, 324/207.22; 333/24 R; 235/449, 493; 73/760, 763, 781
 See application file for complete search history.

(56) References Cited

U.S. PATENT DOCUMENTS

| | | | |
|---|---|---|---|
| 3,219,942 A | 11/1965 | Bell | |
| 3,412,359 A | 11/1968 | Schwyn et al. | |
| 3,444,738 A | 5/1969 | Grangaard, Jr. | |
| 3,755,803 A | 8/1973 | Cole et al. | |
| 3,975,706 A | 8/1976 | Kato | |
| 4,021,705 A | 5/1977 | Lichtblau | |
| 4,127,110 A | 11/1978 | Bullara | |
| 4,302,965 A | 12/1981 | Johnson et al. | |
| 4,556,063 A | 12/1985 | Thompson et al. | |

(Continued)

FOREIGN PATENT DOCUMENTS

EP  112783 A2  7/1984

OTHER PUBLICATIONS

John C. Butler, Anthony J. Vigliotti, Fred W. Verdi & Shawn M. Walsh, "Wireless, passive, resonant-circuit, inductively coupled, inductive strain sensor," Elsevier, Elsevier Science B.V., p. 63-66.

(Continued)

*Primary Examiner* — Arleen M Vazquez
*Assistant Examiner* — Robert P Alejnikov, Jr.
(74) *Attorney, Agent, or Firm* — Robin W. Edwards

(57) ABSTRACT

A wireless in-plane strain and displacement sensor includes an electrical conductor fixedly coupled to a substrate subject to strain conditions. The electrical conductor is shaped between its ends for storage of an electric field and a magnetic field, and remains electrically unconnected to define an unconnected open-circuit having inductance and capacitance. In the presence of a time-varying magnetic field, the electrical conductor so-shaped resonates to generate harmonic electric and magnetic field responses. The sensor also includes at least one electrically unconnected electrode having an end and a free portion extending from the end thereof. The end of each electrode is fixedly coupled to the substrate and the free portion thereof remains unencumbered and spaced apart from a portion of the electrical conductor so-shaped. More specifically, at least some of the free portion is disposed at a location lying within the magnetic field response generated by the electrical conductor. A motion guidance structure is slidingly engaged with each electrode's free portion in order to maintain each free portion parallel to the electrical conductor so-shaped.

25 Claims, 2 Drawing Sheets

(56) References Cited

U.S. PATENT DOCUMENTS

| | | |
|---|---|---|
| 4,594,640 A | 6/1986 | Tatsumi |
| 4,745,401 A | 5/1988 | Montean |
| 4,750,359 A | 6/1988 | Johnson et al. |
| 4,778,552 A | 10/1988 | Benge et al. |
| 4,912,407 A | 3/1990 | Gualtieri et al. |
| 4,929,896 A | 5/1990 | Lara |
| 4,977,786 A | 12/1990 | Davis |
| 5,049,704 A | 9/1991 | Matouschek |
| 5,075,600 A | 12/1991 | El-Hamamsy et al. |
| 5,285,734 A | 2/1994 | MacPherson |
| 5,420,757 A | 5/1995 | Eberhardt et al. |
| 5,423,206 A | 6/1995 | Hetzel |
| 5,423,334 A | 6/1995 | Jordan |
| 5,506,566 A | 4/1996 | Oldfield |
| 5,541,577 A | 7/1996 | Cooper et al. |
| 5,608,417 A | 3/1997 | De Vall |
| 5,675,319 A | 10/1997 | Rivenbert et al. |
| 5,689,263 A | 11/1997 | Dames |
| 5,705,981 A | 1/1998 | Goldman |
| 5,750,939 A | 5/1998 | Makinwa et al. |
| 5,832,772 A | 11/1998 | McEwan |
| 5,873,840 A | 2/1999 | Neff |
| 5,881,310 A | 3/1999 | Airhart et al. |
| 5,892,425 A | 4/1999 | Kuhn et al. |
| 5,909,171 A | 6/1999 | Kyrtsos |
| 5,942,991 A | 8/1999 | Gaudreau et al. |
| 5,969,590 A | 10/1999 | Gutierrez |
| 5,975,250 A | 11/1999 | Brandmeier et al. |
| 6,025,129 A | 2/2000 | Nova et al. |
| 6,025,725 A | 2/2000 | Gershenfeld et al. |
| 6,025,735 A | 2/2000 | Gardner et al. |
| 6,111,520 A | 8/2000 | Allen et al. |
| 6,147,606 A | 11/2000 | Duan |
| 6,164,132 A | 12/2000 | Matulek |
| 6,165,135 A | 12/2000 | Neff |
| 6,194,987 B1 | 2/2001 | Zhou et al. |
| 6,250,430 B1 | 6/2001 | Kyrtsos |
| 6,278,379 B1 | 8/2001 | Allen et al. |
| 6,304,083 B1 | 10/2001 | Owens |
| 6,313,747 B2 | 11/2001 | Imaichi et al. |
| 6,335,690 B1 | 1/2002 | Kenchin et al. |
| 6,348,391 B1 | 2/2002 | Fattaruso |
| 6,359,444 B1 | 3/2002 | Grimes |
| 6,384,721 B1 | 5/2002 | Paielli |
| 6,412,977 B1 | 7/2002 | Black et al. |
| 6,444,517 B1 | 9/2002 | Hsu et al. |
| 6,450,300 B1 | 9/2002 | Kramer |
| 6,463,798 B2 | 10/2002 | Niekerk et al. |
| 6,490,920 B1 | 12/2002 | Netzer |
| 6,498,325 B1 | 12/2002 | Akel et al. |
| 6,515,587 B2 | 2/2003 | Herbert |
| 6,517,483 B2 | 2/2003 | Park et al. |
| 6,532,834 B1 | 3/2003 | Pinto et al. |
| 6,546,795 B1 | 4/2003 | Dietz |
| 6,573,818 B1 | 6/2003 | Klemmer et al. |
| 6,611,188 B2 | 8/2003 | Yeo et al. |
| 6,615,954 B2 | 9/2003 | Wirth et al. |
| 6,639,402 B2 | 10/2003 | Grimes et al. |
| 6,642,720 B2 | 11/2003 | Maylotte et al. |
| 6,661,079 B1 | 12/2003 | Bikulcius |
| 6,662,642 B2 | 12/2003 | Breed et al. |
| 6,677,859 B1 | 1/2004 | Bensen |
| 6,738,697 B2 | 5/2004 | Breed |
| 6,741,169 B2 | 5/2004 | Magiawala et al. |
| 6,758,089 B2 | 7/2004 | Breed et al. |
| 6,834,251 B1 | 12/2004 | Fletcher |
| 6,838,970 B2 | 1/2005 | Basteres et al. |
| 6,850,824 B2 | 2/2005 | Breed |
| 6,853,079 B1 | 2/2005 | Hopper et al. |
| 6,922,126 B1 | 7/2005 | Okamoto et al. |
| 6,963,281 B2 | 11/2005 | Buckley |
| 6,988,026 B2 | 1/2006 | Breed et al. |
| 6,995,669 B2 | 2/2006 | Morales |
| 7,034,672 B2 | 4/2006 | Dinello et al. |
| 7,050,027 B1 | 5/2006 | King et al. |
| 7,082,359 B2 | 7/2006 | Breed |
| 7,086,593 B2 | 8/2006 | Woodard et al. |
| 7,089,099 B2 | 8/2006 | Shostak et al. |
| 7,103,460 B1 | 9/2006 | Breed |
| 7,135,973 B2 | 11/2006 | Kittel et al. |
| 7,159,774 B2 | 1/2007 | Woodard et al. |
| 7,161,476 B2 | 1/2007 | Hardman et al. |
| 7,194,912 B2 | 3/2007 | Oglesby et al. |
| 7,255,004 B2 | 8/2007 | Taylor et al. |
| 7,278,324 B2 | 10/2007 | Smits et al. |
| 7,746,536 B2 * | 6/2010 | Kweon et al. ............... 359/290 |
| 8,179,203 B2 * | 5/2012 | Woodard et al. ............ 333/24 R |
| 2001/0001311 A1 | 5/2001 | Park et al. |
| 2003/0020480 A1 | 1/2003 | Maylotte et al. |
| 2003/0082859 A1 | 5/2003 | Mitsuhiro et al. |
| 2004/0142603 A1 | 7/2004 | Walker |
| 2005/0011163 A1 | 1/2005 | Ehrensvard |
| 2005/0012615 A1 | 1/2005 | Piccoli et al. |
| 2005/0024180 A1 | 2/2005 | Handa |
| 2005/0122305 A1 | 6/2005 | Murao et al. |
| 2005/0149169 A1 | 7/2005 | Wang et al. |
| 2005/0156604 A1 | 7/2005 | Red'ko et al. |
| 2005/0164055 A1 | 7/2005 | Hasegawa et al. |
| 2006/0104330 A1 | 5/2006 | Jong et al. |
| 2006/0191887 A1 | 8/2006 | Baer et al. |
| 2006/0195705 A1 | 8/2006 | Ehrensvard et al. |
| 2006/0243043 A1 | 11/2006 | Breed |
| 2006/0250239 A1 | 11/2006 | Melton |
| 2007/0113642 A1 | 5/2007 | Bonne et al. |
| 2007/0157718 A1 | 7/2007 | Woodard et al. |
| 2007/0181683 A1 | 8/2007 | Woodard et al. |
| 2007/0183110 A1 | 8/2007 | Woodard et al. |
| 2007/0285875 A1 | 12/2007 | Duff, Jr. |
| 2008/0186124 A1 | 8/2008 | Schaffer et al. |
| 2008/0243418 A1 | 10/2008 | Woodard et al. |
| 2009/0072814 A1 | 3/2009 | Woodard et al. |
| 2009/0302111 A1 | 12/2009 | Woodard et al. |
| 2010/0109818 A1 | 5/2010 | Woodard et al. |
| 2011/0021080 A1 * | 1/2011 | Kamiya et al. ............... 439/637 |

OTHER PUBLICATIONS

K.G. Ong, C.A. Grimes, C.L. Robbins & R.S. Singh, "Design and application of a wireless, passive, resonant-circuit environmental monitoring sensor," Elsevier, Elsevier Science 6.V., p. 33-43.

Keat Ghee Ong & Craig A. Grimes, "A resonant printed-circuit sensor for remote query monitoring of environmental paramters," Smart Materials Struct. 9 (2000), p. 421-428.

Stanley E. Woodard et al., "Magnetic Field Response Measurement Acquisition System," NASA TM 2005-213518, NASA, (Feb. 1, 2005).

Stanley E. Woodard and Bryant D. Taylor, "Measurement of Multiple Unrelated Physical Quantities Using a Single Magnetic Field Response Sensor," Measurement Science and Technology (UK), (vol. 18), (Issue 200), (pp. 1603-1613).

* cited by examiner

WIRELESS OPEN-CIRCUIT IN-PLANE STRAIN AND DISPLACEMENT SENSOR REQUIRING NO ELECTRICAL CONNECTIONS

ORIGIN OF THE INVENTION

The invention was made by an employee of the United States Government and may be manufactured and used by or for the Government of the United States of America for governmental purposes without the payment of any royalties thereon or therefore.

BACKGROUND OF THE INVENTION

1. Field of the Invention

This invention relates to wireless electrical devices. More specifically, the invention is a wireless in-plane strain and displacement sensor requiring no electrical connections.

2. Description of the Related Art

Electrical devices typically utilize a plurality of circuit elements wired together to form a circuit. As is well understood in the art, such electrical devices function for a designed purpose when electric current flows through the circuit. If an unwanted break occurs in the circuit, electric current ceases to flow and the circuit must be repaired or replaced to restore device function. Circuit repair or replacement causes downtime, requires manpower, and can be expensive.

In addition, electrical circuits typically use solder to connect circuit elements to one another. The use of solder poses a number of problems. Solder increases the cost of electrical devices and requires the use of venting and air filtration systems during fabrication due to the toxic nature of solder. Further, the high heat required to melt solder can stress or damage circuit boards, and the presence of toxic solder also poses waste issues when old electrical circuits must be disposed of or recycled. For all of these reasons, the typical electrical device has a number of inherent flaws.

One type of electrical device used in monitoring the "health" of structures (e.g., dynamic structures such as aircraft and other vehicles, static structures such as buildings and bridges, etc.) is known as an electrical strain sensor. An electrical strain sensor directly or indirectly relates any mechanical strain to a change in an electrical response. One of the earliest strain gauge designs used a foil of electrically conductive material. When stretched within a material's elastic limits, the foil's resistance increases as the material's longer and narrower shape increases its electrical resistance. When the material is compressed, it becomes shorter and wider thus decreasing the electrical resistance. Strain is directly proportional to the ratio of change in resistance as compared to the resistance of the sensor when it is not deformed. This property is used to make a strain gauge that requires the strain sensor (i.e., the foil) to be directly electrically connected to a resistance measuring circuit such as a Wheatstone bridge.

Other types of electrical strain sensors include capacitive strain sensors, fiber optic strain sensors, and piezoelectric strain sensors. Capacitive strain sensors the displacement between capacitive plates or between neighboring interdigital electrodes. Similar to resistive strain sensors, strain is directly proportional to the ratio of change in capacitance relative to the non-deformed-sensor capacitance. Fiber optics sensors use Bragg gratings that alter the wavelength at which light is reflected and/or transmitted through the fiber. During strain, the grating separation distance changes thus changing the Bragg wavelength (reflected wavelength). The change in wavelength is correlated to strain. The direct optical change can be related to an electrical signal using optoelectronics. A piezoelectric strain sensor uses the changing resistivity of a semiconductor caused by applied strain. All of the above sensors require being part of closed electrical circuits for power and interrogation. Further, because solder and printed circuit boards are typically used to make closed circuits for the sensors discussed above, any reliability, hazardous material, and waste issues associated with solder directly affect them.

SUMMARY OF THE INVENTION

Accordingly, it is an object of the present invention to provide a strain sensor requiring no electrical connections.

Other objects and advantages of the present invention will become more obvious hereinafter in the specification and drawings.

In accordance with the present invention, a wireless in-plane strain and displacement sensor includes an electrical conductor fixedly coupled to a substrate subject to strain conditions. The electrical conductor has first and second ends and is shaped between the first and second ends for storage of an electric field and a magnetic field. The first and second ends remain electrically unconnected such that the electrical conductor so-shaped defines an unconnected open-circuit having inductance and capacitance. In the presence of a time-varying magnetic field, the electrical conductor so-shaped resonates to generate harmonic electric and magnetic field responses, each of which has a frequency, amplitude and bandwidth associated therewith. The sensor also includes at least one electrically unconnected electrode having an end and a free portion extending from the end thereof. The end of each electrode is fixedly coupled to the substrate and the free portion thereof remains unencumbered. The free portion is also parallel to and spaced apart from a portion of the electrical conductor so-shaped. More specifically, at least some of the free portion is disposed at a location lying within the magnetic field response generated by the electrical conductor. A motion guidance structure is slidingly engaged with each electrode's free portion in order to maintain each free portion parallel to the electrical conductor so-shaped.

DETAILED DESCRIPTION OF THE INVENTION

Figure 1A:
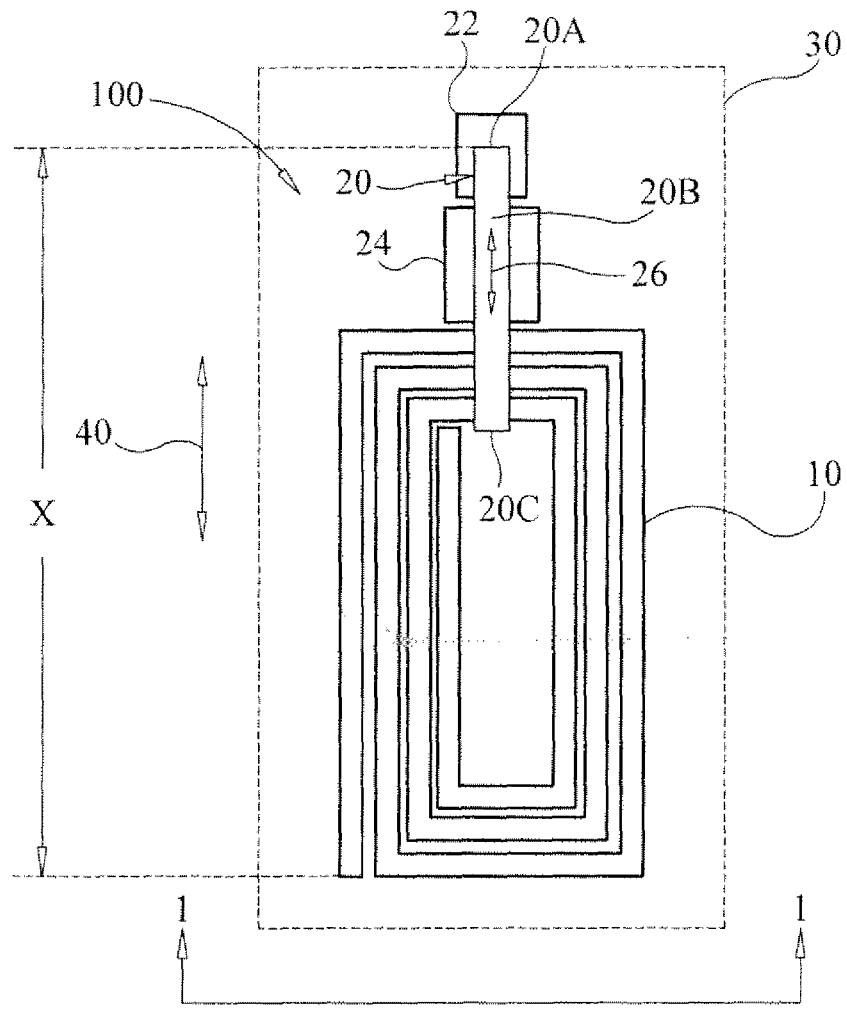
FIG. 1A is a plan view of a wireless in-plane strain and displacement sensor in accordance with an embodiment of the present invention.
Figure 1B:
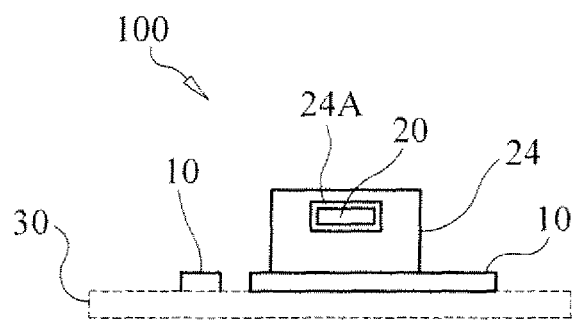
FIG. 1B is an end view of the wireless sensor taken along line 1-1 in FIG. 1A.

Referring now to the drawings and more particularly to FIGS. 1A and 1B, a wireless in-plane strain and displacement sensor in accordance with an embodiment of the present invention is shown and is referenced generally by numeral 100. The illustrated sensor 100 is presented as an exemplary embodiment as there will be many possible embodiments that can be constructed based on the basic principles of the present invention without departing from the scope thereof. In the illustrated embodiment, sensor 100 includes a pattern 10 of electrically conductive material and an electrically unconnected electrode 20 spaced apart from pattern 10.

Electrical conductor pattern 10 is any electrical conductor (e.g., wire, run, thin-film trace, etc.) that can be shaped to form an open-circuit pattern that can store an electric field and a magnetic field. Pattern 10 is a single-component open-circuit element with no electrical connections being made thereto. The term "open-circuit pattern" as used herein means that the conductor has two ends that remain electrically unconnected so that the resulting conductor pattern is an electrical open-circuit having inductance and capacitance attributes.

Pattern 10 can be made from an electrically-conductive run or thin-film trace that can be deposited directly onto or embedded within a substrate material 30 such that pattern 10 is fixed to substrate 30. Dashed lines are used for substrate 30 to indicate substrate 30 does not form part of the present invention. Generally, substrate 30 is an electrically insulating and non-conductive material. If not, some electrically non-conductive material (e.g., an adhesive, a mounting black, etc.) will be disposed between pattern 10 and substrate 30. In either case, substrate 30 is a material structure (e.g., dynamic structure, static structure, etc.) that is expected to undergo strain to be sensed by sensor 100. Thus, the particular substrate/embedding material structure can vary without departing from the scope of the present invention. Although not a requirement of the present invention, the portion of substrate 30 on which pattern 10 is deposited is typically planar. Techniques used to deposit pattern 10 directly onto substrate 30 can be any conventional, metal-conductor deposition process to include thin-film fabrication techniques. As will be explained further below, pattern 10 can be constructed to have a uniform or non-uniform width, and/or uniform or non-uniform spacing between adjacent portions of the pattern's runs/traces.

The basic features of pattern 10 and the principles of operation for sensor 100 will be explained for a spiral-shaped conductor pattern. However, it is to be understood that the present invention could be practiced using other geometrically-patterned conductors provided the pattern has the attributes described herein. The basic features of a spiral-shaped conductor that can function as pattern 10 are described in detail in U.S. Patent Publication No. 2007/0181683, the contents of which are hereby incorporated by reference in their entirety. For purpose of a complete description of the present invention, the relevant portions of this publication will be repeated herein.

As is well known and accepted in the art, a spiral inductor is ideally constructed/configured to minimize parasitic capacitance so as not to influence other electrical components that will be electrically coupled thereto. This is typically achieved by increasing the spacing between adjacent conductive portions or runs of the conductive spiral pattern. However, in the present invention, pattern 10 exploits parasitic capacitance. The capacitance of pattern 10 is operatively coupled with the pattern's inductance such that magnetic and electrical energy can be stored and exchanged by the pattern thereby creating a damped simple harmonic resonator. Since other geometric patterns of a conductor could also provide such a magnetic/electrical energy storage and exchange, it is to be understood that the present invention could be realized using any such geometrically-patterned conductor and is not limited to a spiral-shaped pattern.

The amount of inductance along any portion of a conductive run of pattern 10 is directly related to the length thereof and inversely related to the width thereof. The amount of capacitance between portions of adjacent conductive runs of pattern 10 is directly related to the length by which the runs overlap each other and is inversely related to the spacing between the adjacent conductive runs. The amount of resistance along any portion of a conductive run of pattern 10 is directly related to the length and inversely related to the width of the portion. Total capacitance, total inductance, and total resistance for a spiral pattern are determined simply by adding the effective contributions due to individual portions of the pattern. For example, the effective inductance contribution of a trace portion is the resultant change in the total inductance of pattern 10 due to the changes in the pattern's distributed self-inductance and distributed mutual inductance due to the addition of the trace. The effective capacitance contribution of a trace portion is the resulting change in the capacitance of pattern 10 due to the addition of the trace portion as a result of the charge in the portion creating electric fields with the charges in other parts of pattern increasing the total distributed capacitance. The geometries of the various portions of the conductive runs of the pattern can be used to define the pattern's resonant frequency.

Pattern 10 with its distributed inductance operatively coupled to its distributed capacitance defines a magnetic field response sensor. In the presence of a time-varying magnetic field, pattern 10 electrically oscillates at a resonant frequency that is dependent upon the capacitance, inductance and resistance of pattern 10. This oscillation occurs as the energy in the magnetic field along the length of pattern 10 is harmonically transferred to the electric field between parallel portions of pattern 10. That is, when excited by a time-varying magnetic field, pattern 10 resonates a harmonic electric field and a harmonic magnetic field with each field being defined by a frequency, amplitude, and bandwidth.

Figure 2:
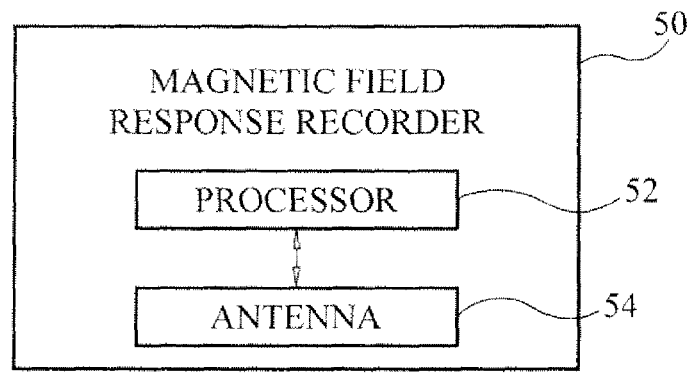
FIG. 2 is a schematic view of a magnetic field response recorder used in an embodiment of the present invention.

The application of an oscillating magnetic field to pattern 10 as well as the reading of the induced harmonic response at a resonant frequency can be accomplished by a magnetic field response recorder. The operating principles and construction details of such a recorder are provided in U.S. Pat. Nos. 7,086,593 and 7,159,774, the contents of which are hereby incorporated by reference in their entirety. Briefly, as shown in FIG. 2, a magnetic field response recorder 50 includes a processor 52 and a broadband radio frequency (RE) antenna 54 capable of transmitting and receiving RE energy. Processor includes algorithms embodied in software for controlling a antenna and for analyzing the RF signals received from the magnetic field response sensor defined by pattern 10. On the transmission side, processor 52 modulates an input signal that is then supplied to antenna 54 so that antenna 54 produces either a broadband time-varying magnetic field or a single harmonic field. On the reception side, antenna 54 receives harmonic magnetic responses produced by pattern 10. Antenna 54 can be realized by two separate antennas or a single antenna that is switched between transmission and reception.

Referring again to FIGS. 1A and 1B, electrode 20 is representative of one or more electrical conductors having no electrical connections made thereto (i.e., it is electrically unconnected) and capable of supporting movement of electrical charges therein. In terms of the in-plane strain and displacement sensor of the present invention, electrode 20 has one end 20A electrically insulated from and fixedly coupled (e.g., using a mounting block or adhesive as indicated by reference numeral 22) to substrate 30 with the remaining part 20B of electrode 20 being unencumbered to its opposing end 200. At least some of unencumbered part 20B overlaps and is spaced-apart from pattern 10 at a location that lies within the magnetic field response (not shown) generated by pattern 10 when pattern 10 is wirelessly excited by, for example, recorder 50 as explained above. That is, some of unencumbered part 20B of electrode 20 overlaps a portion of pattern 10 at some non-zero angle (e.g., 90° in the illustrated embodiment). To keep unencumbered part 20B properly coupled to the magnetic field response of pattern 10, unencumbered part 20B (and generally all of electrode 20) is maintained parallel to pattern 10 at a selected distance therefrom. With just end 20A fixed to substrate 30, elongation or compression strain (indicated by two-headed arrow 40) experienced by substrate 30 will cause electrode 20 to move relative to pattern 10. To insure that unencumbered part 20B remains spaced apart and parallel to pattern 10 during strain-induced movement of electrode 20, an electrically non-conductive support housing 24 cooperates with unencumbered part 20B. For example, housing 24 can be fixedly coupled to substrate 30 and function as a sleeve with an opening 24A (FIG. 1B) formed all the way through housing 24. Opening 24A would be sized for the sliding engagement of unencumbered part 20B. Note that in FIG. 1A, the top portion of housing 24 is not shown to more clearly illustrate unencumbered part 20B. It is to be understood that housing 24 could be replaced by any number of support devices/mechanisms that allowed unencumbered part 20B to move as described above.

For purpose of the present invention, electrode 20 must support the bi-directional movement of electric charges therealong. For a linear (or substantially linear) electrode such as electrode 20, the charges should move along the length of electrode 20. The use of such charge movement in a wireless electrical device is disclosed in U.S. Patent Publication No. 2010/0109818, the contents of which are hereby incorporated by reference in their entirety. In accordance with the teachings of this patent publication, electrode 20 should have a length-to-width aspect ratio (i.e., length divided by width) that is large enough such that the effects of linear movement of electric charges along the length of electrode 20 outweigh the effects of eddy currents in electrode 20 when electrode 20 is positioned in the magnetic field response of pattern 10. The length-to-width aspect ratio of electrode 20 will typically be designed to satisfy a particular sensor's performance criteria. Accordingly, it is to be understood that the particular length-to-width aspect ratio of electrode 20 is not a limitation of the present invention.

In operation, when Pattern 10 is exposed to a time-varying magnetic field (e.g., as generated by recorder 50, a moving magnet, or any other source/method that generates an oscillating magnetic field), pattern 10 resonates harmonic electric and magnetic fields. The generated magnetic field is generally spatially larger than the generated electric field. At least some of unencumbered part 20B of electrode 20 is positioned relative to pattern 10 such that it will lie with at least the generated magnetic field.

In the presence of a time-varying magnetic field, pattern 10 resonates to generate harmonic electric and magnetic field responses. With electrode 20 configured and positioned as described above, the magnetic field response of pattern 10 generates an electromotive force in electrode 20 such that electric charges flow linearly in both directions along the length of electrode 20 as indicated by two-headed arrow 26. Note that the current flow in electrode 20 by linear charge flow 26 is achieved without any electrical contact with (i) pattern 10, (ii) electrode 20, or (iii) between pattern 10, electrode 20 and antenna 54.

In general, for fixed excitation conditions, the magnetic field response frequency, amplitude, and bandwidth of pattern 10 are dependent upon the electric conductivity of any material placed within its magnetic field and electric field. As mentioned above, the conductive material area of electrode 20 defines a relatively large length-to-width aspect ratio. In this way, electrode 20 is electrically powered via oscillating harmonics from pattern 10. In addition, electrode 20 has a magnetic field formed along its length due to the current created in the electrode 20 that is coupled to that of pattern 10. The charge on the electrode 20 will result in an electric field between the charge on pattern 10 and electrode 20. Therefore, electrode 20 and the overlapped portions of pattern 10 will behave somewhat like capacitor plates in a closed electrical circuit except electrode 20 also has a current that creates a magnetic field that is also coupled to the magnetic field of pattern 10. The magnetic field on electrode 20 increases as the spacing between electrode 20 and pattern 10 decreases because electrode 20 is exposed to a higher magnetic strength.

If the magnetic field of electrode 20 is oriented 90° with respect to the overlapped portion of pattern 10, any destructive interference between electrode 20 and pattern 10 should vanish. Accordingly, if the relative positions and orientations of pattern 10 with respect to electrode 20 remain fixed (i.e., there is no strain being experienced by substrate 30), then the magnetic field response of sensor 100 remains unchanged for fixed excitation conditions. These fixed conditions and resulting magnetic field response of sensor 100 define a baseline frequency, amplitude, and bandwidth response for sensor 100 that is recorded prior to using sensor 100.

Changes in the baseline response of sensor 100 will occur wherever linear charge flow 26 changes. This will happen if the amount of overlap between pattern 10 and electrode 20 changes due to elongation or compression strain 40. The change in charge flow 26 causes a change in at least one of the frequency, amplitude and bandwidth response of sensor 100 with respect to the baseline response of sensor 100. The frequency response $\omega$ of pattern 10 changes with the amount that electrode 20 overlaps pattern 10 in accordance with the relationship $\omega=1/2\pi(\text{sqrt}(LC))$ where the inductance L and capacitance C of pattern 10 are functions of the position of electrode 20. Accordingly, if electrode 20 shifts by an amount $\Delta x$ and the overall length of sensor 100 is x, the frequency response $\omega$ of pattern 10 will deviate from its baseline frequency. Since strain is defined by $\Delta x/x$ and x is known as a baseline attribute of sensor 100, the frequency response of pattern 10 is indicative of both the amount of displacement $\Delta x$ as well as the in-plane strain experienced by substrate 30. Once the baseline response of sensor 100 is known and sensor 100 is placed in use, interrogation or monitoring of electrical device 100 (for changes in response relative to the baseline response) can be carried out continuously, periodically, on-demand, etc., without departing from the scope of the present invention.

As mentioned above, both the width of the pattern's conductive runs/traces and the spacing between adjacent portions of the conductive runs/traces can be uniform as in the illustrated embodiment. However, the present invention is not so limited. For example, a spiral pattern's conductive trace width could be non-uniform while the spacing between adjacent portions of the conductive trace could be uniform. Another possibility is that the spiral pattern's conductive trace width could be uniform, but the spacing between adjacent portions of the conductive trace could be non-uniform. Still, further, the spiral pattern's conductive trace width could be non-uniform and the spacing between adjacent portions of the conductive trace could be non-uniform.

Figure 3:
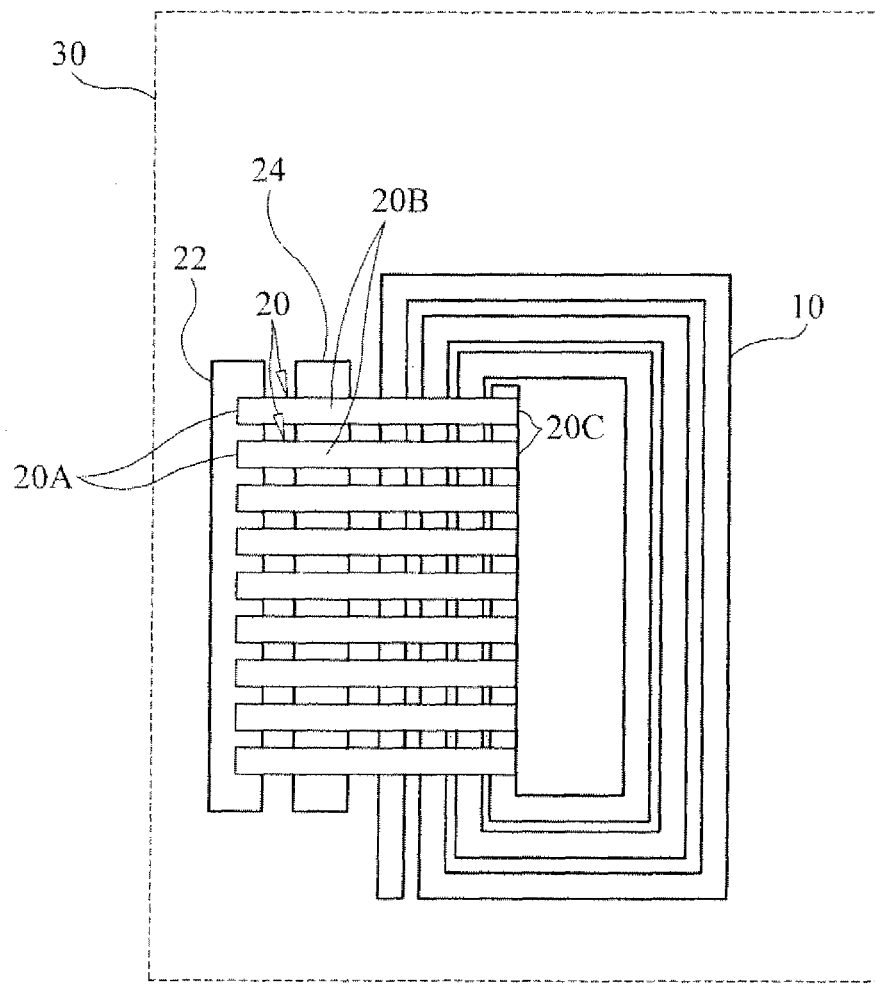
FIG. 3 is a plan view of a wireless in-plane strain and displacement sensor using multiple distributed electrodes in accordance with another embodiment of the present invention.

A variety of electrode configurations can also be used without departing from the scope of the present invention. For example, although a single electrode has been shown in the above-described embodiment, the present invention is not so limited. Accordingly, the embodiment in FIG. 3 illustrates the use of a number of electrodes 20 with at least some of their corresponding unencumbered parts 205 overlapping pattern 10. Once again, the top portion of support housing 24 is not shown to more clearly illustrate unencumbered parts 205. The greater number of electrodes 20 produces a greater response sensitivity so that smaller amounts of in-plane strain and displacement can be discerned.

The advantages of the present invention are numerous. The sensor is a passive open-circuit device that significantly reduces manufacturing cost. No solder connections are needed to form the sensor. Therefore, the sensor can be completely recyclable. The sensor uses only two components and no physical or electrical connections between the components are required thereby making the sensor inherently more reliable then any device that depends upon connections between components. For example, the sensor could be powered and interrogated after most damage events. The sensor can be placed on a system during any phase of fabrication or use. If placed on a component or in a mold of a non-conductive component, the sensor could also be used to track the component during manufacturing.

The sensor could also be used as a human implanted sensor, e.g., incorporated into hip or joint replacements. This has many benefits over what is currently being done in that all the advantages above apply and the sensor could be wirelessly powered and interrogated external, to the body, i.e., no electrical connections or leads are placed inside the body. Further, no surgery would be necessary to discern if there is any damage to the sensor.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

The invention claimed is:

1. A wireless in-plane strap and displacement sensor, comprising:
   an electrical conductor adapted to be fixedly coupled to a substrate subject to strain conditions, said electrical conductor having first and second ends and shaped between said first and second ends for storage of an electric field and a magnetic field, said first and second ends remaining electrically unconnected such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency, amplitude and bandwidth associated therewith;
   at least one electrically unconnected electrode having an end and a free portion extending from said end, wherein said end is adapted to be fixedly coupled to said substrate and said free portion is unencumbered, is parallel to, and is spaced apart from, a portion of said electrical conductor so-shaped, at least some of said free portion further being disposed at a location lying within said magnetic field response so-generated; and
   a motion guidance structure slidingly engaged with each said free portion for maintaining each said free portion parallel to said portion of said electrical conductor so-shaped.

2. A wireless sensor as in claim 1, further comprising a magnetic field response recorder for wirelessly transmitting said time-varying magnetic field to said electrical conductor and for wirelessly detecting at least one of said frequency, amplitude, and bandwidth associated with said magnetic field response so-generated.

3. A wireless sensor as in claim 1, wherein said electrical conductor comprises a thin-film trace.

4. A wireless sensor as in claim 1, wherein said electrical conductor lies in a two-dimensional plane.

5. A wireless sensor as in claim 1, wherein said electrical conductor forms a spiral between said first and second ends thereof.

6. A wireless sensor as in claim 5, wherein each said free portion is at a non-zero angular orientation with respect to portions of said spiral.

7. A wireless sensor as in claim 1, wherein said at least some of said free portion overlaps a portion of said electrical conductor so-shaped.

8. A wireless sensor as in claim 1, wherein each said electrode comprises a linear electrode.

9. A wireless sensor as in claim 1, wherein said motion guidance structure is electrically non-conductive.

10. A wireless sensor as in claim 1, wherein said motion guidance structure comprises a sleeve fitted over each said free portion.

11. A wireless in-plane strain and displacement sensor, comprising:
    a thin-film electrical conductor adapted to be fixedly coupled to a substrate subject to strain conditions, said electrical conductor having first and second ends and shaped between said first and second ends for storage of an electric field and a magnetic field, said first and second ends remaining electrically unconnected such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency, amplitude and bandwidth associated therewith;
    at least one electrically unconnected linear electrode having an end and a free portion extending from said end, wherein said end is adapted to be fixedly coupled to said substrate and said free portion is unencumbered, is parallel to, and is spaced apart from, a portion of said electrical conductor so-shaped, at least some of said free portion overlapping a portion of said electrical conductor so-shaped; and
    a motion guidance structure slidingly engaged with each said free portion for maintaining each said free portion parallel to said portion of said electrical conductor so-shaped.

12. A wireless sensor as in claim 11, further comprising a magnetic field response recorder for wirelessly transmitting said time-varying magnetic field to said electrical conductor and for wirelessly detecting at least one of said frequency, amplitude and bandwidth associated with said magnetic field response so-generated.

13. A wireless sensor as in claim 11, wherein said electrical conductor lies in a two-dimensional plane.

14. A wireless sensor as in claim 11, wherein said electrical conductor forms a spiral between said first and second ends thereof.

15. A wireless sensor as in claim 14, wherein each said free portion is at a non-zero angular orientation with respect to portions of said spiral.

16. A wireless sensor as in claim 11, wherein said motion guidance structure is electrically non-conductive.

17. A wireless sensor as in claim 11, wherein said motion guidance structure comprises a sleeve fitted over each said free portion.

18. A wireless in-plane strain and displacement sensor system, comprising:

an electrical conductor adapted to be fixedly coupled to a substrate subject strain conditions, said electrical conductor having first and second ends and shaped between said first and second ends for storage of an electric field and a magnetic field, said first and second ends remaining electrically unconnected such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency, amplitude and bandwidth associated therewith;

at least one electrically unconnected linear electrode having an end and a free portion extending from said end, wherein said end is adapted to be fixedly coupled to said substrate and said free portion is unencumbered, is parallel to, and is spaced apart from, a portion of said electrical conductor so-shaped, at least some of said free portion further being disposed at a location lying within said magnetic field response so-generated;

a motion guidance structure slidingly engaged with each said free portion for maintaining each said free portion parallel to said portion of said electrical conductor so-shaped; and a magnetic field response recorder for wirelessly transmitting said time-varying magnetic field to said electrical conductor and for wirelessly detecting at least one of said frequency, amplitude and bandwidth associated with said magnetic field response so-generated.

19. A system as claim 18, wherein said electrical conductor comprises a thin-film trace.

20. A system as in claim 18, wherein said electrical conductor lies in a two-dimensional plane.

21. A system as in claim 18, wherein said electrical conductor forms a spiral between said first and second ends thereof.

22. A system as in claim 21, wherein each said free portion is at a non-zero angular orientation with respect to portions of said spiral.

23. A system as in claim 18, wherein said at least some of said free portion overlaps a portion of said electrical conductor so-shaped.

24. A system as in claim 18, wherein said motion guidance structure is electrically non-conductive.

25. A system as in claim 18, wherein said motion guidance structure comprises a sleeve fitted over each said free portion.

* * * * *